Nov. 22, 1966  H. J. SCHWERDHÖFER  3,286,549
DUAL SPEED HUB WITH AUTOMATIC SPEED SHIFT
Filed Aug. 1, 1963
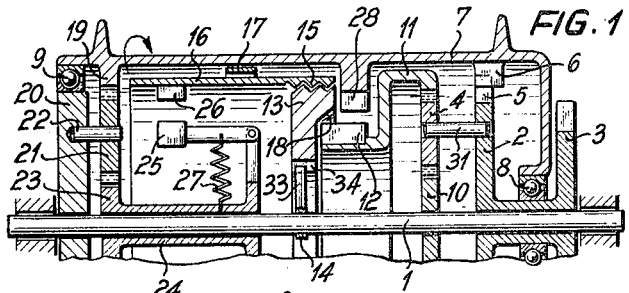
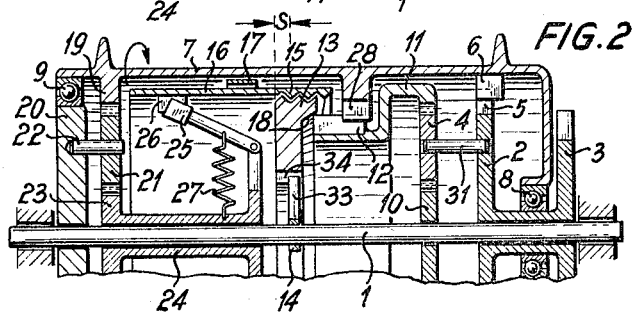
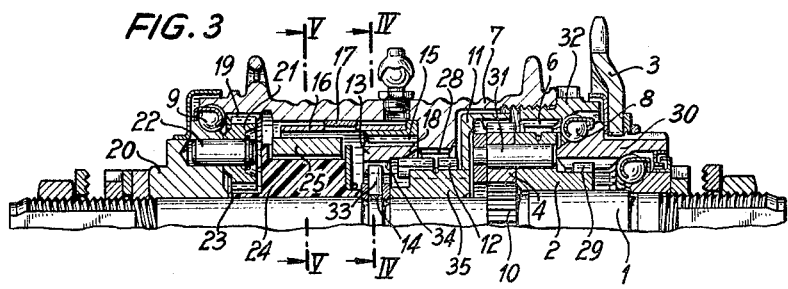
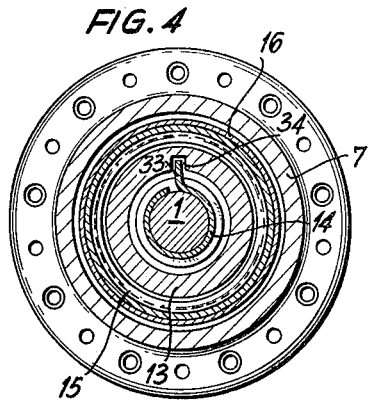 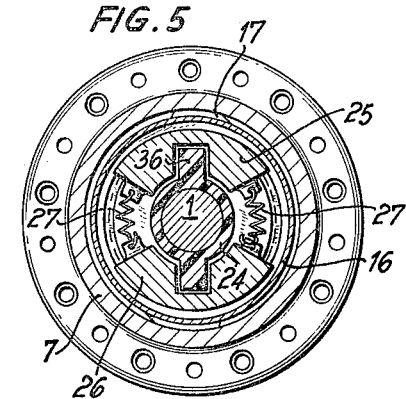
INVENTOR
Hans Joachim Schwerdhöfer
By
Richard Low
Agt United States Patent Office 3,286,549
Patented Nov. 22, 1966

3,286,549
DUAL SPEED HUB WITH AUTOMATIC SPEED SHIFT
Hans Joachim Schwerdhöfer, Schweinfurt (Main), Germany, assignor to Fichtel & Sachs A.G., Schweinfurt (Main), Germany, a corporation of Germany
Filed Aug. 1, 1963, Ser. No. 299,258
Claims priority, application Germany, Aug. 18, 1962, F 37,630
14 Claims. (Cl. 74—752)

This invention relates to multiple speed hubs for bicycles and similar vehicles, and more particularly to multiple speed hubs in which the transmission ratio of a variable speed transmission is shifted automatically responsive to the rotary speed of the wheel attached to the hub, and thus to the traveling speed of the vehicle.

Known multiple speed hubs for bicycles are equipped with a drive sprocket which is normally engaged by a drive chain, and with a hub shell on which the wheel rim is mounted by means of wire spokes. Planetary gearing in the hub shell rotates with the drive sprocket, and the speed of the hub shell may be varied by alternatively connecting the hub shell to elements of the planetary gearing which rotate at different speeds. The connecting elements such as free-wheeling clutches are controlled by a centrifugal governor which responds to the rotary speed of the hub shell.

The automatic shifting of the transmission ratio of the gearing enhances the safety and convenience of bicycle operation. When the centrifugal governor is arranged to select a transmission ratio in which the crank axle speed is held within certain limits, the effort of pedaling a bicycle can be significantly reduced. An arrangement in which the shifting between transmission ratios is controlled by the traveling speed of the bicycle is more favorable than one in which shifting occurs at a predetemined torque applied to the drive sprocket. Changes in traveling speed tend to be less abrupt than changes in applied torque, and changes of the transmission ratio are therefore less frequent when controlled by speed than under torque control which contributes to the comfort of the rider.

Multiple speed hubs in which changes in the transmission ratio are controlled by centrifugal governors are difficult to build because of the small centrifugal forces available from fly weights small enough to be arranged within the severely limited space of a hub shell, and because of the low rotary speed of a bicycle wheel under all normal operating conditions.

The principal object of the invention is the provision of a centrifugally controlled automatically shifting multiple speed hub in which reliable shifting is achieved without enlarging the dimensions of the hub shell beyond those customary in manually shifted multiple speed hubs.

Another object is the provision of a multiple speed hub which reproducibly responds to relatively small centrifugal forces with a speed shift.

With these and other objects in view, the invention in its more specific aspects provides an improvement in an otherwise conventional dual speed hub equipped with a transmission having planetary gearing and two free-wheeling clutches which are interposed between the hub shell and two respective elements of the planetary gearing operating at different speeds. The first clutch which connects the shell to the more rapidly rotating element is disengageable whereby power is transmited by the second clutch in the low speed position of the transmission. In the high speed position, the first clutch is engaged.

To move this clutch between the high and low speed positions, the invention provides two threadedly engaged control members whose threads are centered on the axis of the hub. One of the control members is yieldably secured against rotation relative to the stationary shaft of the hub. The other control member may be connected to the hub shell for rotation thereby by means of a speed governor arranged in the hub shell and connected to the same for rotation. The governor responds to a predetermined rotary speed of the shell to engage the other control member with the shell, whereby the two control members are threadedly moved relative to each other in the direction of the hub axis when the hub shell rotates. Motion transmitting means are operatively interposed between one of the control members and the transmission to move the afore-mentioned first clutch responsive to the axial movement of the control members relative to each other.

Other features and many of the attendant advantages of this invention will be readily appreciated as the same becomes better understood by reference to the following detailed description of a preferred embodiment when considered in connection with the accompanying drawing in which like reference numerals designate like parts throughout the figures thereof, and wherein:

FIG 1 shows a dual speed hub of the invention in fragmentary axial section, the transmission of the hub being in low speed position. The operating elements of the hub are illustrated by conventional symbols.

FIG. 2 shows the hub of FIG. 1 in the high speed position.

FIG. 3 illustrates the structural features of a bicycle hub of FIG. 1 in axial section, only one half of the hub being shown, the hub being closely similar to that illustrated in FIGS. 1 and 2.

FIG. 4 is a radially sectional view of the hub of FIG. 3, the section being taken on the line IV—IV; and FIG. 5 shows the hub of FIG. 3 in radial section on the line V—V.

Referring now to the drawing in detail and initially to FIG. 1, there is indicated a stationary shaft 1 on which a planet carrier 2 is coaxially rotatable. A drive sprocket 3 is fixedly fastened to the planet carrier 2 near an axial end of the shaft 1 which will hereinafter be referred to as the drive end. Several planet shafts 31 of which only one is seen in the drawing carry respective planet gears 4 for rotation about axes which are parallel to and radially spaced from the axis of the shaft 1.

A free-wheeling clutch is interposed between the planet carrier 2 and the shell 7 of the hub. The clutch consists of several rockable pawls 5 and a ratchet 6 fixedly attached on the hub shell 7. The pawls, of which only one is illustrated, are urged into engagement with the ratchet 6 by pawl springs, not shown. The hub shell 7 is rotatable about the axis of the shaft 2 on anti-friction bearings 8, 9.

The planet gears 4 simultaneously mesh with a sun gear 10 fixedly mounted on the shaft 2 and with the internal teeth of a ring gear 11. Another free-wheeling clutch is interposed between the ring gear 11 and the hub shell 7. The clutch consists of pawls 12 circumferentially spaced on the ring gear 11, and engageable with a ratchet 28 on the hub shell 7 under the pressure of a pawl spring not seen in FIG. 1.

In the low speed position of the transmission shown in FIG. 1, the pawls 12 are held away from the ratchet 28 by the pressure exerted by a conical contact face of a flange 18 on a control ring 13. The ring 13 is axially movable in the hub over a distance S (FIG. 2), and is normally secured against rotation about the axis of the shaft 1 by a spring 14. The spring is coiled tightly about the shaft 1 and secured against axial displacement. An end portion 33 of the spring extends from the shaft radially into an axially elongated groove 34 in the control ring 13. External threads 15 on the ring 13 which are coaxial with the shaft 1 engage mating threads on a control sleeve 16 which is secured against axial movement in a conventional manner, not visible in the drawing. A coil spring 17 mounted on the sleeve 16 frictionally engages the internal wall of the shell 7, whereby the sleeve 16 tends to rotate with the hub shell.

A tubular speed governor support 24 is freely rotatable on the shaft 1. It coaxially carries the central gear 23 of a gear train structurally undistinguishable from planetary gearing which also includes gears 21 rotatable on respective shafts 22. The shafts are mounted on a bearing member 20 which is fixedly fastened on the shaft 1 and carries the afore-mentioned anti-friction bearing 9. The gears 21 mesh simultaneously with the central gear 21 and with a ring gear 19 on the hub shell 7.

Two centrifugal weights 25, of which only one is seen in FIG. 1, are hingedly mounted on the support 24 for movement in a radial plane toward and away from the axis of the shaft 1. They are urged by return springs 27 to move toward the shaft 1. When a weight 25 moves radially outward from the inoperative position shown in FIG. 1 into the position illustrated in FIG. 2 under centrifugal forces sufficient to overcome the restraint of the coordinated spring 27, the weight 25 engages a radially projecting portion 26 of the control sleeve 16 and couples the sleeve to the hub shell 7 for simultaneous rotation in an opposite direction at a speed which is increased by the gearing 19, 21, 23.

The rotary movement of the sleeve 16 causes threaded axial movement of the ring 13 away from the drive end of the hub. The resulting withdrawal of the conical flange 18 permits the pawls 12 to engage the ratchet 28.

Referring now to FIGS. 3 to 5, the dual speed hub of the invention is seen in more structural detail. The shaft 1 is equipped with conventional fastenings for mounting in the rear fork of a bicycle frame. A driver member 30 fixedly carries the sprocket 3 and is connected to the planet carrier 2 by a coupling 29 consisting of axially elongated engaged teeth on the carrier 2 and the driver member 30. The driver member 30 also provides an inner race for the anti-friction bearing 8. The outer race 32 of the bearing is fixedly attached to the hub shell 7. The pawls 5 are mounted on the planet carrier 2. The cooperating ratchet 6 is integral with the bearing race 32.

The sun gear 10 of the power transmission train is integral with the shaft 1. The planet gears 4 on their shafts 31 mesh with the sun gear 10 and with an internal gear rim on the ring gear 11. A hub portion 35 of the ring gear 11 is rotatably mounted on the shaft 1 and carries the pawls 12 which are held out of engagement with the ratchet 28 on the hub shell 7 by the control ring 13. The ring is near the drive end of the hub in the low speed position of the transmission illustrated in FIG. 3.

The coil spring 14 is axially secured on the shaft 1 by retaining rings, and its free end portion 33 engages an axially elongated slot 34 in the ring 13 as best seen in FIG. 4. The frictional engagement of the spring 14 with the shaft 2 tends to prevent rotation of the ring 13 about the shaft axis.

As is best seen from joint consideration of FIGS. 3 and 5, the speed governor carrier 24 which is made of plastic has two radial arms 36 which slidably engage conforming recesses in the two centrifugal weights 25. The weights have the shapes of circumferentially spaced ring segments extending over 90° arcs, and are urged toward the center of the shaft 2 by two helical tension springs 27 which extend in the gaps between the weights. The outer cylindrical surfaces of the weights 25 constitute friction faces of a coupling which are urged by the mass of the weights against a cooperating friction face on the control sleeve 16 when the weights rotate at a speed sufficient to generate centrifugal forces stronger than the restraining forces of the springs 27. The projections 26 shown in FIGS. 1 and 2 are replaced in the hub shown in FIGS. 3-5 by a friction face on the sleeve 16. The spring 17 is an integral portion of the sleeve 16.

The dual speed hub illustrated in the drawing and described hereinabove operates as follows:

If the transmission is not in the lower speed position illustrated in FIGS. 1 and 3 to 5 when rotation of the driver member 30 is started, there is an immediate change in transmission ratio. The initial rotation of the hub shell 7 in the direction of the arrow in FIG. 2 is transmitted to the control sleeve 16 by the friction spring 17. Rotation of the sleeve causes threaded axial movement of the ring 13 whose rotation is impeded by the spring 14. The movement of the ring 13 is transmitted to the pawls 12 when the conical flange 18 of the ring 13 engages the pawls 12 and swings them out of engagement with the ratchet 28. Power is transmitted from the drive sprocket 3 to the hub shell 7 by the driver member 30, the pawl carrier 2, the pawls 5 and the ratchet 6. The establishment of low speed conditions is very rapid so that the rider hardly becomes aware of the change in transmission ratio. The axial movement of the control ring 13 toward the drive end of the hub is limited by abutment against the ratchet 28. Thereafter, the spring 17 slips on the inner wall of the hub shell 7 or the spring 14 slips on the shaft 1.

During travel of the bicycle, the speed governor carrier 24 is rotated at a speed higher than that of the hub shell 7 and in the opposite direction by the gearing 19, 21, 23. When the rotary speed of the centrifugal weights 25 becomes sufficiently high, the weights move radially outward from the inoperative position shown in FIG. 5, and their friction faces engage the control sleeve 16 to couple the same to the carrier 24, and thereby to the hub shell 7. The sleeve is rotated in a direction opposite to the direction of hub shell rotation indicated by arrows in FIGS. 1 and 2, and the control ring 13 is axially moved away from the drive end of the hub because of the frictional drag exerted by the spring 14. The flange 18 of the ring 13 releases the pawls 12 for engagement with the ratchet 28 as shown in FIG 2. When relative threaded movement of the sleeve 16 and of the ring 13 is stopped by abutment of the latter against the governor support 24, the springs 14 and 17 slip in the manner described above.

In the high speed position of the transmission illustrated in FIG. 2, motive power is transmitted from the sprocket 3 to the hub shell 7 by way of the ring gear 11 which rotates at a higher speed than the planet carrier 2. The ratchet 6 overtravels the pawls 5.

The wheel speed at which the position of the dual speed transmission is changed from low speed to high speed can be selected by suitable combination of the mass of the weights 25 with the force of the return springs 27.

When the rotary speed of the hub shell drops below the shifting speed, the weights 25 are returned to their inoperative position illustrated in FIG. 5, and the frictional coupling provided between the control sleeve 16 and the carrier 24 is disengaged. The friction of the spring 17 on the shell 7 then is sufficient to move the ring 13 toward the drive end of the hub for disengagement of the pawls 12 from the ratchet 28. The low speed position of the transmission is restored.

The shift to the lower transmission ratio cannot occur, however, as long as power is being transmitted from the planet carrier 2 to the hub shell 7 by the pawls 12 and the ratchet 28. Only during free wheeling, be it ever so brief, that is, while the hub shell 7 is not driven by torque applied to the sprocket 3, the gear change is effected by rotation of the control sleeve 16 under the urging of the spring 17. This feature of the dual speed hub of the invention affords the rider a measure of control over the otherwise automatic change in transmission ratio, and permits him to avoid the shock of an unexpected shift, and undesired frequent shifting.

Obviously, many modifications and variations of the present invention are possible in the light of the above teachings. It is therefore to be understood that within the scope of the appended claims, the invention may be practiced otherwise than as specifically described.

What is claimed is:

1. In a dual-speed hub, in combination:
    (a) a shaft having an axis;
    (b) a driver member and a hub shell mounted on said shaft for rotation about said axis;
    (c) a dual speed transmission interposed between said driver member and said shell for transmitting the rotation of said driver member to said shell member, said transmission being movable between a lower speed position and a higher speed position, the transmission ratio of said transmission being lower in said lower speed position than in said higher speed position;
    (d) two control members threadedly engaged for relative rotation about said axis;
    (e) impeding means for impeding rotation of one of said control members about said axis;
    (f) centrifugal speed governor means responsive to rotation of said hub shell at a predetermined speed for drivingly connecting the other control member to said hub shell for rotation in a predetermined direction, whereby said control members are moved axially relative to each other during rotation of said hub shell at said predetermined speed, and
    (g) motion transmitting means operatively interposed between one of said control members and said transmission for moving said transmission from one to the other one of said positions thereof responsive to the relative axial movement of said control members.

2. In a hub as set forth in claim 1, yieldable means connecting said other control member to said shell for joint rotation in a direction opposite to said predetermined direction, said governor means including rotating means for rotating said other control member in said predetermined direction against the restraint of said yieldable means, said impeding means yieldably securing said one control member against rotation about said axis.

3. In a hub as set forth in claim 2, said rotating means including means for rotating said other control member at a rotary speed higher than the speed of said hub shell.

4. In a hub as set forth in claim 2, said yieldable means including a resilient member integral with said other control member and frictionally engaging said hub shell.

5. In a hub as set forth in claim 1, said speed governor means including a centrifugal weight radially movable relative to said axis and rotatable about the same, a portion of said weight engaging said other control member at said predetermined speed, and a yieldably resilient member permanently urging said weight to move toward said axis.

6. In a hub as set forth in claim 5, a radial projection on said other control members engageable by said weight when the same moves away from said axis against the restraint of said resilient member.

7. In a hub as set forth in claim 1, said transmission including planetary gearing having a plurality of meshingly engaged elements, two of said elements rotating at different speeds when said driver member rotates, and two free-wheeling clutches respectively interposed between said two elements and said hub shell, the clutch associated with the gearing element rotating at higher speed being disengageable, said motion transmitting means being effective for causing engagement and disengagement of the last-mentioned clutch.

8. In a hub as set forth in claim 7, said disengageable clutch including a ratchet and a pawl movable toward and away from said ratchet in a radial plane, said motion transmitting means including a member having a conical contact face about said axis, and axially movable relative to said pawl for moving the same away from ratchet.

9. In a hub as set forth in claim 1, said speed governor means including a centrifugal weight and gearing means operatively interposed between said weight and said hub shell for rotating said weight at a speed higher than the rotary speed of said hub shell, said gearing means including a central gear, said speed governor means further including a support member rotatable about the axis of said shaft and integral with said central gear, said centrifugal weight being radially movable on said support member.

10. In a hub as set forth in claim 9, said support member having a radial arm, and said weight slidably engaging said arm for radial movement thereon.

11. In a dual speed hub, in combination:
    (a) a shaft having an axis;
    (b) a driver member and a hub shell mounted on said shaft for rotation about said axis;
    (c) a dual speed planetary transmission operatively interposed between said driver member and said shell,
        (1) said transmission including a plurality of elements meshingly engaged for rotation with said driver member,
        (2) two of said elements simultaneously rotating at different speeds,
        (3) a first free-wheeling clutch engageably interposed between said hub shell and one of the two elements of said transmission rotating at higher speed, and
        (4) a second free-wheeling clutch interposed between said hub shell and the other one of said two transmission elements;
    (d) two control members having respective engaged threads about said axis;
    (e) first friction means for yieldably securing one of said control members against rotation about said axis;
    (f) second friction means for yieldably securing the other control member to said hub shell for rotation therewith;
    (g) engaging means on said one control member engageable with said first clutch for operating the same when said one control member axially moves relative to said other control member;
    (h) a support member rotatable about said axis;
    (i) gearing interposed between said hub shell and said support member for rotating the same in a direction opposite to the direction of rotation of said hub shell;
    (j) a centrifugal weight mounted on said support member for rotation therewith about said axis, and for radial movement; and
    (k) a yieldably resilient member permanently urging said weight to move radially inward toward an inoperative position adjacent said axis, said weight being urged to move radially outward by centrifugal forces toward an operative position thereof when said support member rotates, said weight and said other control member having respective engagement faces engaged for joint rotation of said other control member with said support member when said centrifugal weight is in said operative position thereof, said faces jointly constituting a coupling.

12. In a hub as set forth in claim 11, said one control member being axially movable, and said other control member being secured against axial movement, and abutment means for limiting axial movement of said one control member.

13. In a hub as set forth in claim 11, said gearing including means for rotating said support member in said opposite direction at a speed higher than the rotary speed of said hub shell.

14. In a hub as set forth in claim 11, said shaft being stationary, and said first friction means yieldably securing said one control member to said stationary shaft.

References Cited by the Examiner

UNITED STATES PATENTS

| | | | |
|---|---|---|---|
| 2,796,775 | 6/1957 | Gleasman | 74—751 |
| 2,910,157 | 10/1959 | Gleasman | 74—752 |
| 2,956,443 | 10/1960 | Nelson | 74—336.5 |
| 3,180,167 | 4/1965 | Paschakarnis | 74—752 |

FOREIGN PATENTS

| | | |
|---|---|---|
| 632,305 | 11/1949 | Great Britain. |
| 218,798 | 4/1942 | Switzerland. |

DAVID J. WILLIAMOWSKY, *Primary Examiner.*

THOMAS C. PERRY, *Examiner.*